3,500,188
Patented Mar. 10, 1970

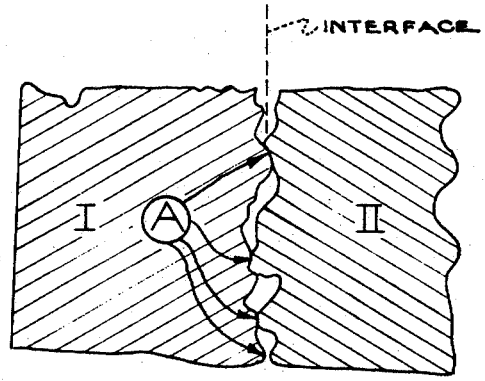
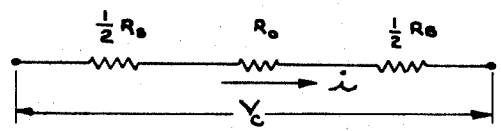
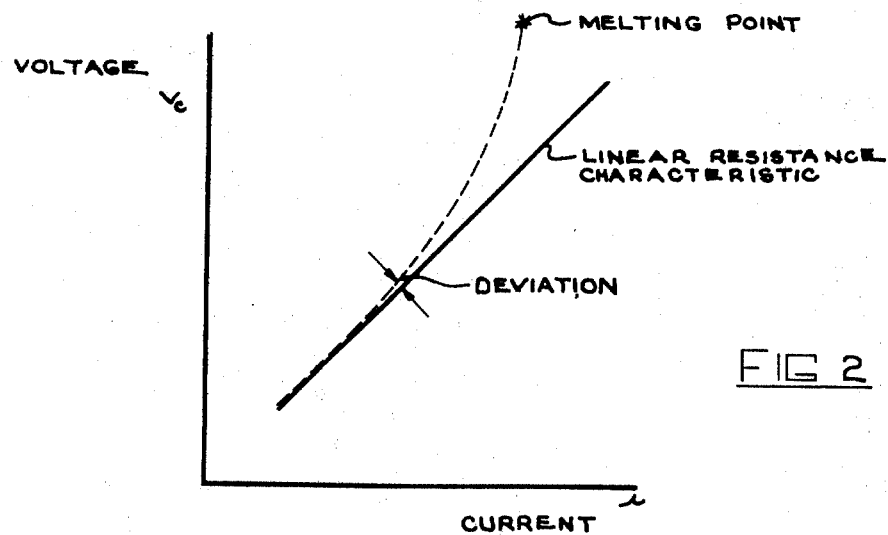
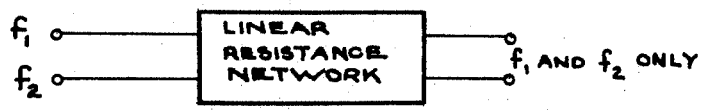
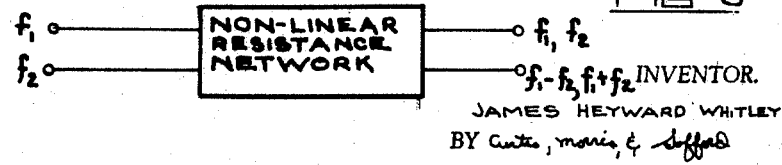
INVENTOR.
JAMES HEYWARD WHITLEY
BY Curtis, Morris, & Safford March 10, 1970   J. H. WHITLEY   3,500,188
METHOD AND MEANS FOR MEASURING CONSTRICTION RESISTANCE
BASED ON NONLINEARITY
Filed June 2, 1966   5 Sheets-Sheet 2
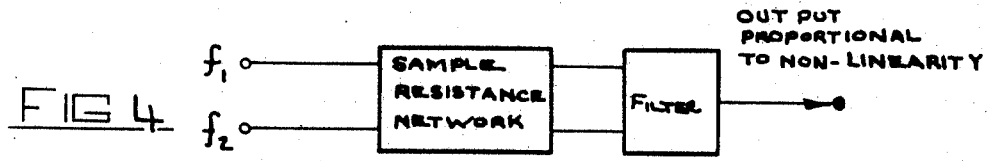
FIG 4
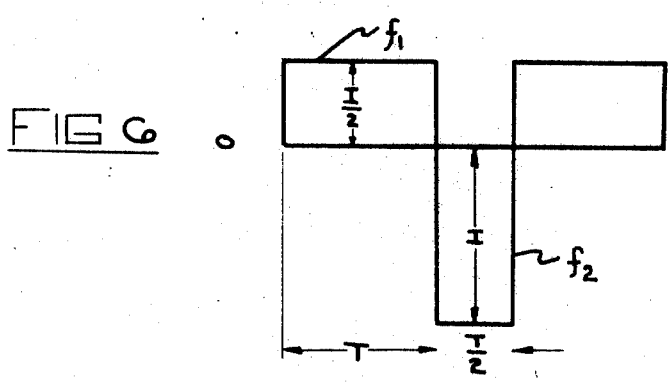
FIG 6
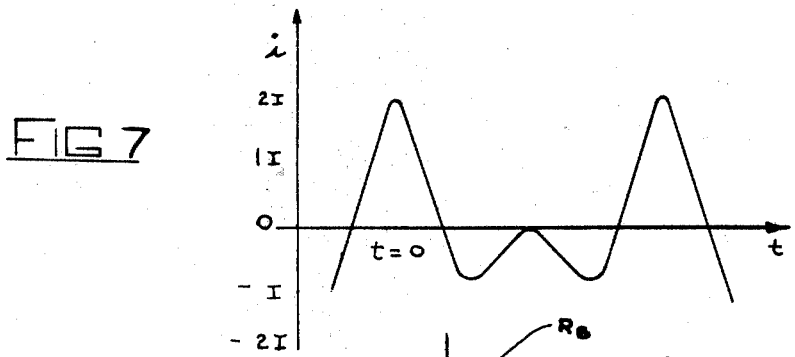
FIG 7
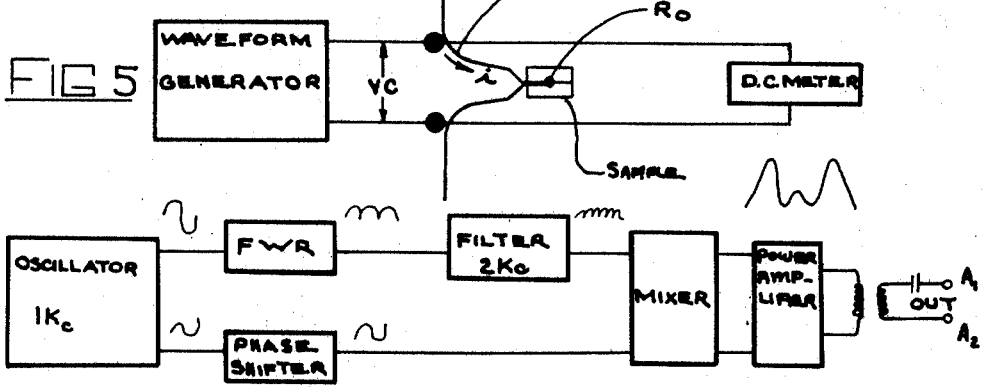
FIG 5
FIG 8
INVENTOR.
JAMES HEYWARD WHITLEY
BY Curtis, Morris, & Saffod

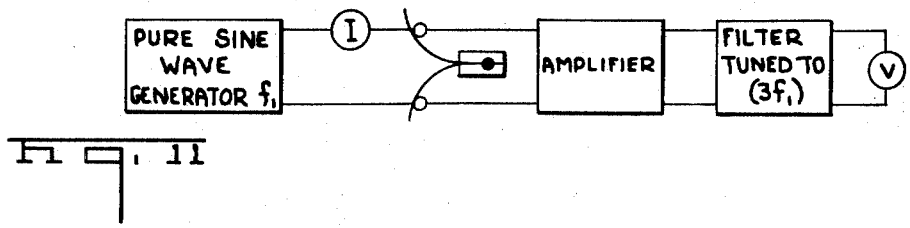
Fig. 11
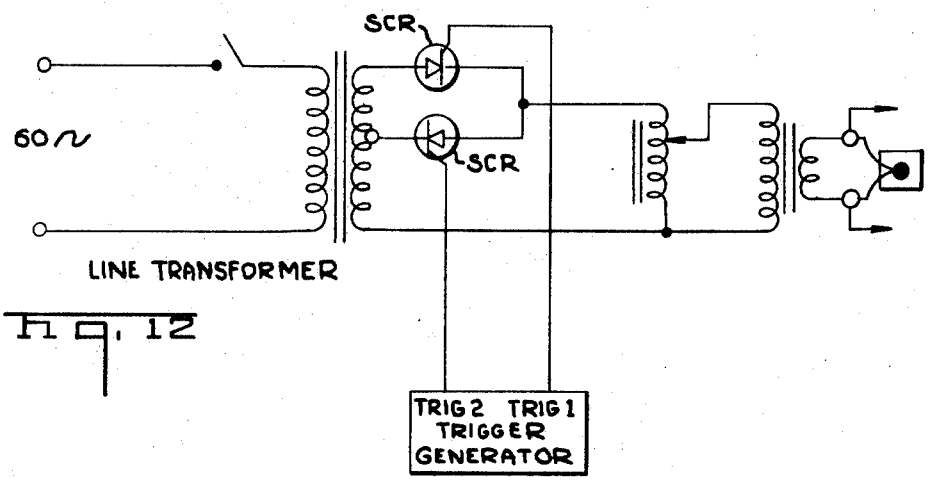
Fig. 12
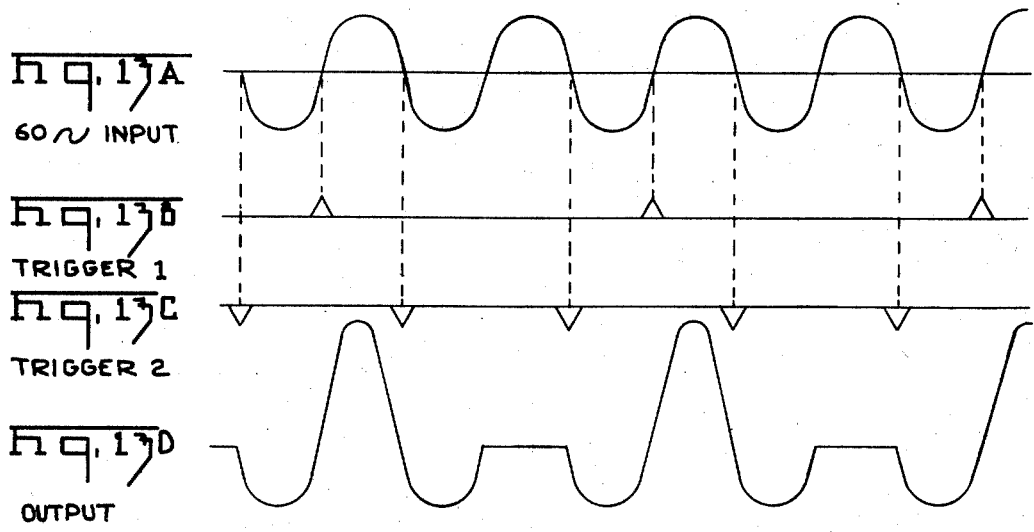
Fig. 13A 60∼ INPUT
Fig. 13B TRIGGER 1
Fig. 13C TRIGGER 2
Fig. 13D OUTPUT

United States Patent Office

3,500,188
METHOD AND MEANS FOR MEASURING CONSTRICTION RESISTANCE BASED ON NONLINEARITY
James Heyward Whitley, Harrisburg, Pa., assignor to AMP Incorporated, Harrisburg, Pa.
Continuation-in-part of application Ser. No. 519,869, Jan. 11, 1966. This application June 2, 1966, Ser. No. 554,887
Int. Cl. G01r 27/14
U.S. Cl. 324—64
16 Claims

ABSTRACT OF THE DISCLOSURE

Method and apparatus are disclosed for measuring electrical connection resistance in terms of nonlinearity produced by constriction resistance in a nondestructive manner. An input AC signal nonsymmetrical about its zero axis and having a waveform amplitude providing an average DC current level of zero is applied to members joined forming the contact resistance being measured. The constriction voltage component developed across said members as a result of the input signal is then measured to determine constriction resistance of the interface between each member as a measure of contact resistance. In one embodiment an input signal waveform producing a third harmonic component is used with the measurement being made only of the third harmonic voltage component.

BACKGROUND OF THE INVENTION

This application is a continuation-in-part of my previously filed application, Ser. No. 519,869, filed Jan. 11, 1966, now abandoned, on which priority is asserted as to subject matter common therewith.

The end objective of any electrical connection technique is to achieve a low resistance conductive path which is mechanically and electrically stable in its environment of use. The whole art of connection design is based upon achieving this objective. This includes the design criteria for the tools or equipment utilized to effect connections as well as material and configuration of the structures of the connected parts and the means, if any, placed between the connected parts. To a large extent the art of making electrical connections including design improvements is thus based upon accurately measuring the electrical resistance resulting from a given connection technique and the structure employed. Since electrical connections have been in wide-spread use over a long period of time, one would expect that the art of measurement of electrical resistance in connections would be well developed. That it is not is well appreciated by both those in the laboratory and those working in the field of application and production of connection devices.

The reason for the lack of satisfactory techniques for measuring electrical resistance of connections is that it is physically difficult to implement. The usual union of conductive members forming a connection consists of a relatively large body of conductive material between which there exists an interface of small contact spots of engagement or asperities, the resistance of which forms the contact resistance which is the measure of the quality of connection. Not only is the interface defining the contact resistance relatively inaccessible it is, practically speaking, undefinable in that the asperities are so small and so randomly distributed that only their effect can be practically determined. In most practical connection devices the interface defining contact resistance is also of a path length and quantity of material which is an extremely small percentage of the path length and bulk of the material of the two members being connected. The "bulk" resistance of the member is hard to separate from contact resistance.

One of the techniques which has been used over the years to measure contact resistance is that of applying a current in series with the contact members and then measuring the overall resistance including that of the bulk material surrounding the interface and the contact resistance of the interface. Thereafter, a calculated value for bulk resistance is subtracted from the measured overall resistance to provide a contact resistance. This is accomplished through measurement of voltage drops and, as will be appreciated, involves an attempt to ascertain relatively different quantities, one of which is measured and one of which is calculated. To do this it is the practice to utilize probes which are placed on either side of the contact interface. A problem inherent in this is that the probe points inherently involve variables, including the position relative to the interface, the amount of pressure contact area of the probe points and other factors related to the skill of the user. The foregoing takes a relatively long time to accomplish.

Another type of contact resistance measurement technique employed is one of direct temperature measurement, temperature being a function of resistance. The problem with this type of measurement is that the currents involved to effect appreciable temperature change cause changes in the interface between the members and thus changes in the contact resistance being measured. In other words this technique of measurement alters the thing being measured. This means that there is an inherent error and an inherent variable added to the technique. It also means that the method of measurement is destructive.

One of the more recent developments in the art of measuring contact resistance is described in the publication Thermal Effects in Electronic Connectors, J. B. P. Williamson, Proceedings of the 6th International Electronic Circuit Packaging Symposium, Aug. 23 and 24, 1965. This technique relates to the use of a pulse of current through the connection under test for a time sufficient to heat the asperities in the interface without substantially heating the bulk resistance of the surrounding material. The method is based upon the fact that for a given contact resistance there is an amount of current which causes a permanent change in the contact resistance which is a derivable constant for the material being employed for the conductor. With the constant for a given material being known, it is then possible to measure the value of the applied current and thereby obtain an absolute value of contact resistance. The change in the sample contact resistance by the test is, however, permanent and therefore the technique is destructive. It also is based upon a measured quantity which exists only after the contact resistance has been permanently changed and thus involves the problem of the measurement technique changing the thing which is being measured to create a variable relating to the degree of change applied in repeated measurements.

In all of the foregoing prior art techniques and especially in the first mentioned technique, environment is important in that the time required for performing measurements is sufficiently long to permit local radiation, ambient temperature, humidity and other factors to affect both the samples under test and the equipment utilized in the test. This has the practical effect of making the measurements a laboratory operation. The latter mentioned technique takes much less time and for that reason is some improvement, but unfortunately it is destructive, which means that the thing being actually tested cannot be said to be strictly representative of the contact resistance being produced in a line of connections.

SUMMARY OF THE INVENTION

This invention relates to a method and means for measuring electrical connection resistance in terms of the nonlinearity produced by constriction resistance.

It is an object of the present invention to provide a method of measuring electrical resistance of connections which is more accurate than heretofore available. It is another object to provide a method and means for measuring electrical resistance in connectors and terminal devices which provides an accurate determination of contact resistance very quickly. It is still a further object of the invention to provide a method and means of nondestructively measuring electrical contact resistance which substantially eliminates variables introduced by test setup and procedure. It is still another object of the invention to provide a means and method for measuring electrical contact resistance wherein the length of lead to the sample test and its bulk resistance is not a critical factor.

It is still another object of the invention to provide a method and means of measuring electrical contact resistance which is amenable to production use under field conditions.

The foregoing problems are overcome and the foregoing objectives are attained through the present invention by measuring the distortion caused by a test sample to a particular signal waveform impressed upon the interface of the test sample. The method of the invention may be carried out by a variety of means for developing different types of signal waveforms and applying such to the sample under test and a variety of different types of detection or indicating devices connected to measure the distortion to the waveform caused by the sample under test.

The method of the invention is based upon the fact that the constriction resistance of the contact interface between conductive members joined to form a connector is nonlinear. The nonlinearity provides the aforementioned distortion even at voltages and currents applied to the sample which are sufficiently low as to only reversibly alter the contact resistance of the sample; i.e. not actually melt the material in the interface defining contact resistance and thus alter the asperities to any substantial extent. The invention procedure is thus nondestructive and it more nearly provides a measure of the contact resistance which actually exists in a given connection. The procedure takes only a short time and does not require either careful set-up in terms of probe placement or isolation. It is, therefore, useful for production and field applications.

In the drawings:

FIGURE 1 is a partial section of a connection of conductive members enlarged to show the contact interface which defines contact resistance;

FIGURE 2 is a plot of voltage versus current with linear resistance and nonlinear resistance curves included to explain the invention;

FIGURES 3, 4 and 5 are block diagrams included to show the theory of the invention;

FIGURES 6 and 7 are representations of input signal waveforms in accordance with one aspect of the invention;

FIGURE 8 is a schematic diagram of one embodiment of the circuit of the invention for measuring DC components to ascertain contact resistance;

FIGURE 11 is a block diagram showing another circuit embodiment of the invention related to the use of AC harmonics to ascertain contact resistance;

FIGURE 12 is a schematic diagram for a circuit like that of FIGURE 11 useful with a 60 cps. supply; and FIGURES 13a–d are waveforms included to explain the circuit of FIGURE 12.

GENERAL DESCRIPTION

Figure 9:
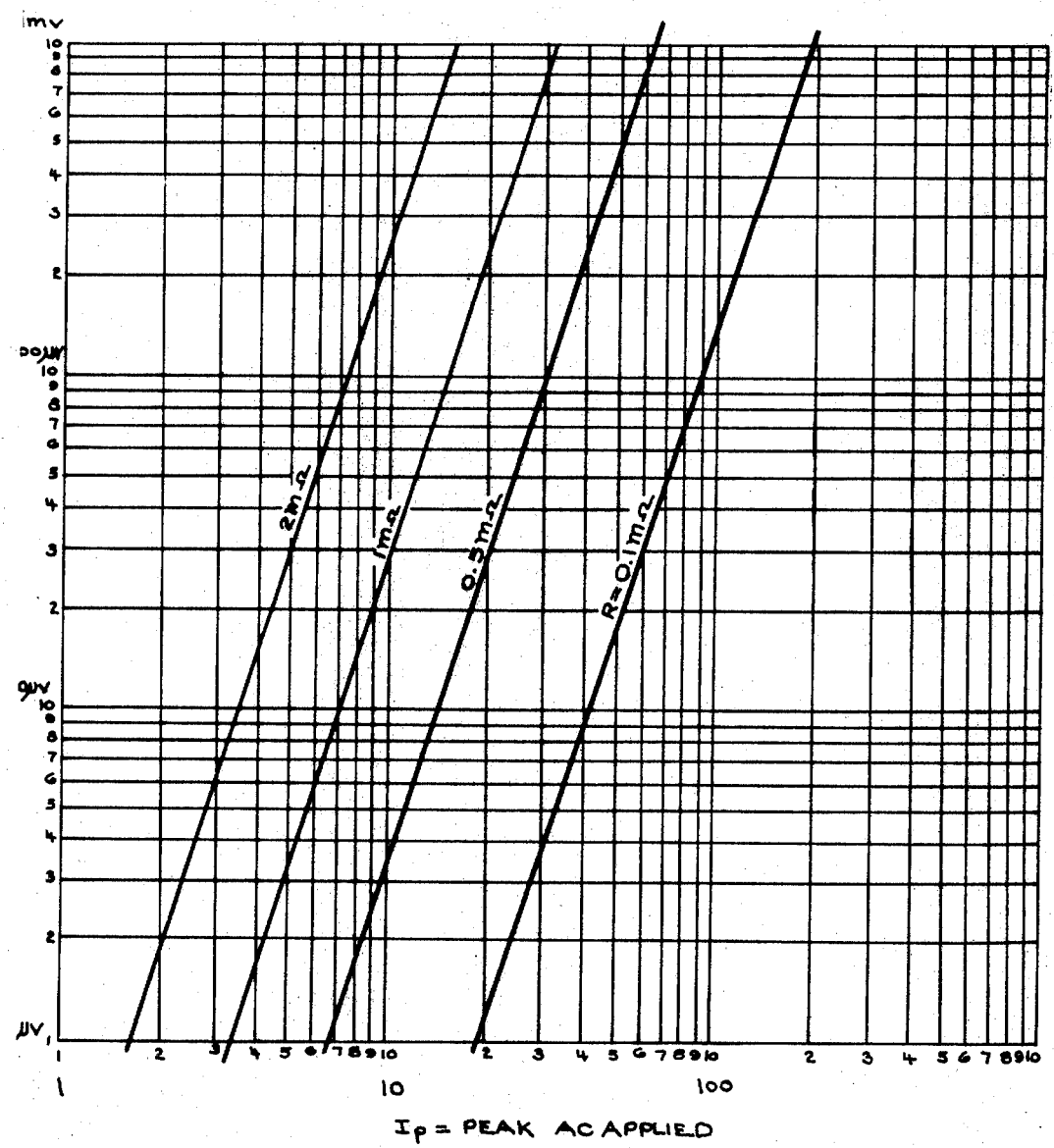
FIGURES 9 and 10 are plots of constriction resistance derived from relationships developed in accordance with the waveform from applied and measured voltages and currents.

Referring now to FIGURE 1, a contact interface is shown existing between two conductive members I and II, formed by a number of asperities A. It is the electrical resistance between I and II defined by the asperties A in the interface which determines the quality of the connection between the devices and in the final analysis the design of contact and terminal structures, application tooling and all factors related to the production of satisfactory electrical connections. In FIGURE 1 beneath the contact interface there is shown an equivalent circuit which relates to the application of a test voltage $V_c$ across the interface. The resistance of the material of I and II is represented by $R_B$ assuming that substantially the same material and geometry exists on each side of the interface to the point of application of $V_c$. The current which flows through the interface is $i$. The reduction in cross-sectional area of conductive material caused by the asperities A tends to constrict the flow lines of the current $i$ to the interface and the resistance associated with this phenomena is termed constriction resistance and is shown in the equivalent circuit as $R_o$.

Electrical conduction in metals is inherently nonlinear in that as current flow increases there is more joule heating developed and the increase in temperature raises the resistance of the current path. In bulk as in the bodies of I and II this nonlinearity is apparent only when the current $i$ is varied very slowly, allowing equilibrium to be established at each new current level. At any appreciable frequency an average temperature related to the RMS current value will be established and the conductor material will behave in a linear fashion under steady state conditions.

The resistance which exists in the interface defined by the contact between the asperities A involves a very small volume of material. This small volume has a low thermal time constant and the temperature of the constriction region can follow rapid variation in current. From this it will be apparent that for certain frequencies the constriction resistance $R_o$ will vary with instantaneous values of $i$ while $R_B$ will remain relatively constant.

In this way $R_o$ can be separated from $R_B$ to provide a direct measurement of contact resistance.

It is known that the constriction resistance associated with a contact interface shows nonlinear characteristics to some degree. FIGURE 2 shows a plot of voltage $V_c$ and current $i$ with a resulting linear characteristic shown solidily and with a resulting characteristic of nonlinear resistance shown as a broken line. As can be seen, the degree of deviation from the linear relationship increases with the quantity applied voltage and current. There is nevertheless a deviation present at even relatively small values of applied voltage and current. The method of the invention relates to the measurement of this deviation and the means by which it may be measured. It will be noted that measurement in accordance with the invention occurs far below the melting point of the sample, which may be considered as that point wherein a substantial member of the asperities A are irreversibly altered in arrangement, size or configuration. It is believed that no substantial change occurs as to these asperities in the test sample within the frame of tolerance permitted by most production techniques.

Turning now to a general description of means to implement measurement of the deviations previously mentioned, FIGURE 3 shows a block diagram representative of a linear resistance network. An input of two distinct signal frequencies $f_1$ and $f_2$ will produce an output consisting of only the input frequencies. Also in FIGURE 3 there is a showing of a nonlinear resistance network having an input of signals of frequencies $f_1$ and $f_2$. The output from the nonlinear resistance network will include the input frequencies $f_1$ and $f_2$, harmonics of $f_1$ and $f_2$, and also various sum and difference frequencies of those signals and associated harmonics, as for example, $f_1 \pm 2f_2$. FIGURE 4 shows another block diagram wherein frequencies $f_1$ and $f_2$ are applied to a sample resistance network which is representative of the network formed by the asperities of a test sample. In accordance with the invention a filter placed on the output of the sample resistance network may be employed to detect the amount of nonlinearity introduced by the resistance network of the test sample. This will provide a measure of constriction resistance and therefore contact resistance. The filter may be chosen to operate on the particular intermodulation component which is most desirable to employ for this purpose.

As will be shown, by proper choice of input signal waveform the intermodulation components may be made to include a DC component which is in quantity related to the degree of nonlinearity and therefore to constriction resistance.

Also, as will be shown, other choices of input waveform may be employed using the invention technique to measure AC components which are related to the degree of nonlinearity and constriction resistance in a test sample.

In FIGURE 5 three is shown in block diagram a waveform generator set up to apply a nonsymmetrical waveform of a voltage $V_c$ to a test sample. The leads up to the sample and portions of the sample material make up the bulk resistance $R_B$. The constriction resistance $R_o$ is as previously defined. Rather than using a filter and measuring some AC component, a DC meter is shown connected across the sample and is employed to detect the DC component which will exist and be representative of the nonlinearities introduced by the construction resistance.

FIGURE 6 shows an ideal input signal waveform for use with the circuit of FIGURE 5. It is ideal because it produces the greatest amount of DC voltage per unit applied peak current in the nonlinear constriction resistance.

FIGURE 7 shows an input signal waveform which is an approximation to that of FIGURE 6 and is obtainable from pure sine waves.

Both of these waveforms are nonsymmetrical about the zero axis but have an average DC level of zero. This is accomplished by making the waveform amplitude of one polarity of the signal be approximately twice that of the other and adjusting the duration of the smaller amplitude waveform to be twice that of the higher amplitude waveform.

As will be shown, the input of waveforms having these characteristics into a nonlinear resistance network will produce an output of a level proportional to the quantity of nonlinearity to measure constriction resistance.

DETAILED DESCRIPTION

In the publication "Electrical Contacts Handbook," Ragnar Holm, Springer-Verlag, Berlin 1958, there is given a formal derivation of the relationship between constriction voltage and temperature. From this it is apparent that by measuring constriction voltage the temperature difference between the bulk material surrounding the interface and the contact interface itself may be deduced. In the case of metallic contact the Wiedemann-Frantz-Lorenz Law:

Equation 1
$$\rho K = LT$$

$\rho$ = electric resistivity
K = thermal conductivity
T = absolute temperature
L = Lorenz constant is applicable, and the final relationship developed by Holm is:

Equation 2
$$L(T_1^2 - T_0^2) = \frac{V^2}{4}$$

$T_1$ = maximum temperature in constriction
$T_0$ = temperature of bulk metal
V = constriction voltage The Holm relationship gives the maximum temperature $T_1$ in the constriction region as a function of the total constriction voltage V. The temperature throughout the constriction region varies from a maximum of $T_1$ down to $T_0$, the bulk metal temperature. The resistivity of the metal in the constriction region, therefore, varies from a value characteristic of $T_0$ up to a maximum value related to $T_1$. An effect of this "supertemperature" $(T_1 - T_0)$ in the constriction region is to increase the net constriction resistance.

In the publication on pg. 80, Equation 18.12, there is the following expression:

Equation 3
$$\frac{R(O)}{R(T_1)} = \frac{T_0}{\sqrt{T_1^2 - T_0^2}} \operatorname{Tan}^{-1} \sqrt{\frac{T_1^2 - T_0^2}{T_0}}$$

This relates the constriction resistance R(O) at $T = T_0$ to $R(T_1)$, the constriction resistance having a maximum temperature $T_1$. This equation also assumes the validity of the Weideman-Franz Law, Equation 1.

Now, inverting the foregoing expression (Equation 3) and combining it with Equation 2 the following results:
Invert (3), Equation 4
$$\frac{R(T_1)}{R(O)} = \sqrt{\frac{T_1^2 - T_0^2}{T_0}} \frac{1}{\operatorname{Tan}^{-1} \sqrt{\frac{T_1^2 - T_0^2}{T_0}}}$$

Now, from Equation 2:

Equation 5
$$(T_1^2 - T_0^2) = \frac{V^2}{4L}$$

Equation 6
$$\sqrt{\frac{T_1^2 - T_0^2}{T_0}} = \frac{V}{2T_0\sqrt{L}}$$

and since
$$\frac{R(T_1)}{R(O)} = \frac{V}{V_0}$$

where:

V = constriction voltage drop
$V_0$ = constriction voltage drop at very low current (no heating)

putting Equation 6 in Equation 4, we have:

Equation 7
$$\frac{V}{V_0} = \frac{V}{2T_0\sqrt{L}} \frac{1}{\operatorname{Tan}^{-1} \frac{V}{2T_0\sqrt{L}}}$$

Equation 8
$$\operatorname{Tan}^{-1} \frac{V}{2T_0\sqrt{L}} = \frac{V_0}{2T_0\sqrt{L}}$$

Equation 9
$$V = 2T_0\sqrt{L} \tan \frac{V_0}{2T_0\sqrt{L}}$$

The series expansion for tan $x$ is:

$$\operatorname{Tan} x = X + \frac{X^3}{3} + \frac{2}{15} X^5 + \dots$$

When the argument $$\frac{V_0}{2T_0\sqrt{L}}$$

is small the first two terms of the tan $x$ expansion are sufficient, and Equation 9 can be written as:

Equation 10

$$V = 2T_0\sqrt{L}\left(\frac{V_0}{2T_0\sqrt{L}} + \frac{V_0^3}{24T_0^3L\sqrt{L}}\right)$$

or

Equation 11

$$V = V_0 + \frac{1}{12T_0^2\sqrt{L}}V_0^3$$

where $R_0$ is the (constant) low-current value of constriction resistance, and $i$ is the instantaneous value of current.

For general purposes then the relationship Equation 12 can be expressed as $V = R_0 i + 40R_0^3 i^3$. If currents of two frequencies $w_1$ and $w_2$ are mixed and applied with $w_2$ having a phase displacement of ① and a relative amplitude $k$ with respect to $w_1$, $i$ may be expressed as follows:

Eq. 14     $i = I[\cos w_1 t + k \cos (w_2 t + ①)]$

By substituting Equation 14 into Equation 13 an expression can be derived by expansion and recollection of terms to produce the following expression:

Eq. 15     $V = e_0(t) = e_1(f_1) + e_2(f_2)e_2(3f_1)$
$+ e_4(3f_2) + e_4(3f_2) + e_5(2f_1 \pm f_2) + e_6(f_1 \pm 2f_2)$

This indicates that the various components are comprised of voltages $e_1$, $e_2$, $e_3$, $e_4$, $e_5$ and $e_6$, each being a function of a certain frequency or frequencies and only that frequency. For example, the component $e_1(f_1)$ is a function of only $f_1$ and the component for the third harmonic is a function of $3f_1$ and only $3f_1$.

The various components of constriction voltage are:

Eq. 16     $e_1 = [R_0 I_1 + 10R_0^3 I_1^3(3+6k^2)] \cos w_1 t$
Eq. 17     $e_2 = [kR_0 I_1 + 10R_0^3 I_1^3(3k^3+6k)] \cos (w_2 t + ①)$
Eq. 18     $e_3 = 10R_0^3 I_1^3 \cos 3w_1 t$
Eq. 19     $e_4 = 10k^2 R_0^3 I_1^3 \cos (3w_2 t + 3①)$
Eq. 20     $e_5 = 30kR_0^3 I_1^3 \cos (2w_1 t \pm w_2 t \pm ①)$
Eq. 21     $e_6 = 30k^2 R_0^3 I_1^3 \cos (w_1 t \pm 2w_2 t \pm 2①)$ As one embodiment of the invention the frequencies $f_1$ and $f_2$ are adjusted so that $w_1 = 2w_2$ and ① is made ○. If we assume that $k = 1$ Equation 21 yields a constant DC voltage developed by the constriction resistance $R_0$ when subjected to the AC waveform of Equation 14.

Equation 22     $eDC \cong 30R_0^3 I_1^3$

If single frequency excitation is employed, $(k=0)$, the relationships for $e_1$ and $e_3$ components become:

Equation 23     $e_1 = [R_0 I_1 + 30R_0^3 I_1^3] \cos w_1 t$ and
Equation 24     $e_3 = 10R_0^3 I_1^3 \cos 3w_1 t$ From this it will be apparent that a measure of third harmonic generation is a measure of constriction resistance.

If the amplitude of $I_1$ is made so that $R_0 I_1 \cong 10$ mv., then $$\frac{e_3}{e_1} \cong 10^{-3}$$

and the third harmonic is about 60 db below the fundamental and measurable by a sharply tuned amplifier-filter circuit.

The method of the invention is adaptable to measuring any of the modulation components above given. For ease of instrumentation two techniques are preferred. First, as to the DC component, the circuit of FIGURE 5 may be implemented as in FIGURE 8. From a 1 kc. oscillator there is produced a first sine wave output to a full wave rectifier (FWR) and a second sine wave output to a phase shifter which delays the since wave 180°. The output from the FWR is thus filtered to provide a 2 kc. waveform (of half the amplitude of the delayed waveform). These two signals are then amplified and mixed to provide an output to terminals $A_1$ and $A_2$ like that shown in FIGURE 7. The test sample is placed across $A_1$ and $A_2$. A DC voltmeter placed across $A_1$ and $A_2$ will provide a measurement of the constriction resistance of the sample.

In an actual use it is preferred to allow about a second for the DC voltage level to stabilize before reading. For constriction resistances in the normal range of ~1 m$\Omega$, peak currents of 10–20 amps will produce voltages in the 10–100 $\mu$v. range. These DC voltages are measurable even in the presence of much larger AC voltages, and the method of the invention permits measuring constriction resistance without actually probing the contact region.

The circuit of FIGURE 8 is comprised of well-known electronic components combined to form a test rig for contact resistance measurements in accordance with the invention. It is contemplated that means may be provided to respond automatically to the D.C. voltage measured to provide a go-no-go check of connection for production use.

Figure 10:
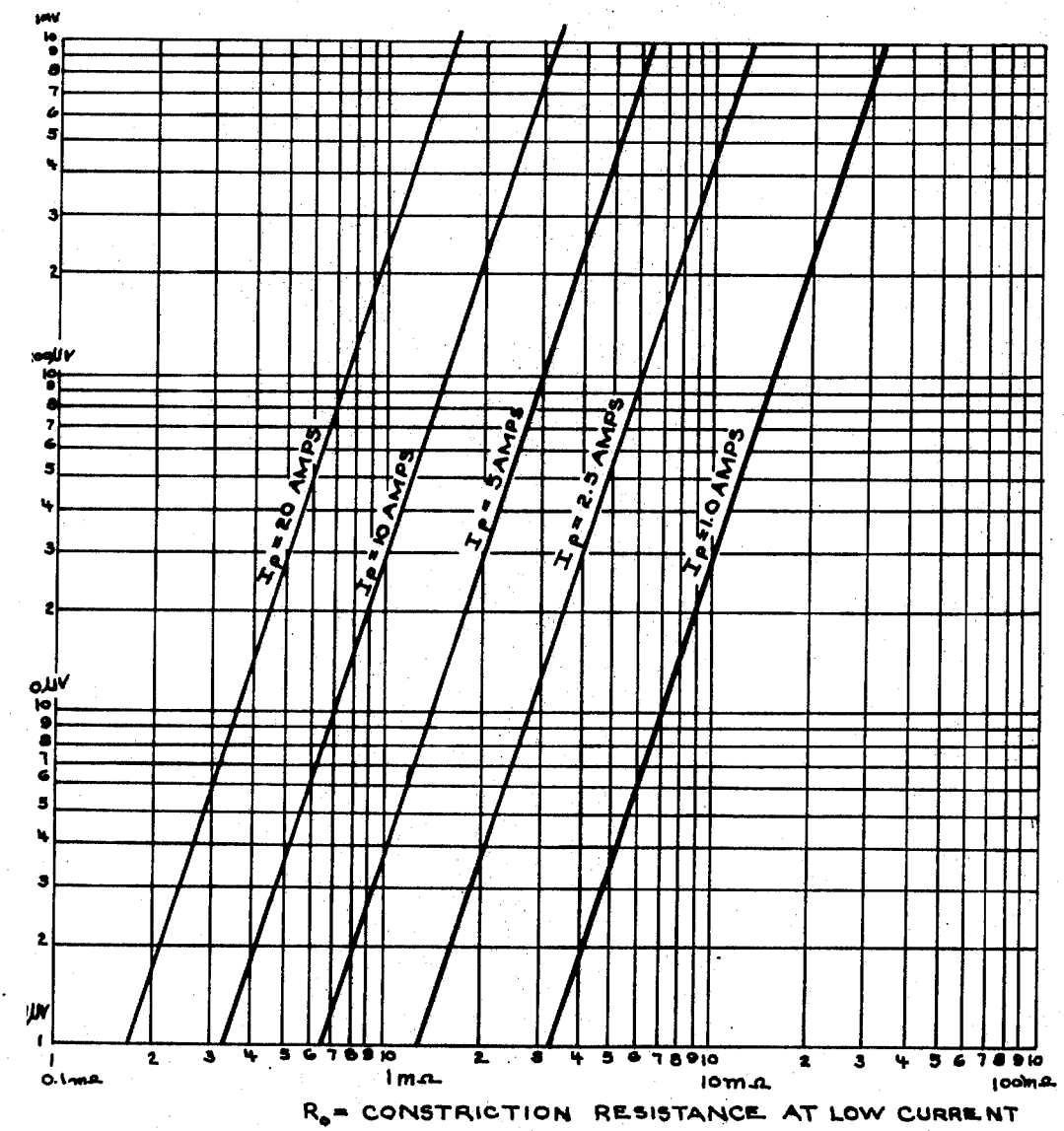

To implement use of the circuit of FIGURE 8 and use of the invention plots of current and voltage in terms of $R_0$ may be made from Equation 22. FIGURES 9 and 10 show such plots in a range useful with standard connections. The quantity of $R_0$ may be read directly for a given DC voltage reading.

Turning to measurement of an AC component wherein a single frequency is used. FIGURE 11 shows a circuit which is adapted to detect the third harmonic. In an actual test the generator was a sine wave generator made to provide an input $f_1 = 500$ c.p.s., 20 mv. and 20 amps peak to peak. Filtering and amplification were provided by a Hewlett-Packard Harmonic Analyzer. In practice this instrument would be replaced with a simple audio amplifier and filter sharply tuned to $3f_1$ and to reject $f_1$ by at least 60 db.

For convenience, a power supply was developed to be driven by 60 c.p.s. line voltage to supply a waveform similar to that discussed relative to FIGURE 6. This waveform is shown in FIGURE 13d. FIGURE 12 shows a circuit for producing the waveform directly from 60 c.p.s. line supply. With the line transformer supplied, as indicated in FIGURE 13a, a trigger generator was made to provide triggers 1 and 2 timed as indicated in FIGURES 13b and 13c to a pair of SCR's connected as indicated. The SCR's are driven to fire and produce a waveform adjusted by a potentiometer and then supplied to the primary of a step down transformer. The secondary is coupled to supply the test sample with the waveform of FIGURE 13d.

The resulting voltage is a measure of constriction resistance and is detected as indicated in FIGURE 5.

When using the circuit of FIGURE 12 it has been determined that the formula for the DC voltage generated should be modified as follows:

Eq. 25     $VD \cong 25R_0^3 I_0^3$

Having now described the invention in a mode intended to enable its practice as preferred, we define the invention through the following claims.

What is claimed is:

1. In a method of measuring electrical contact resistance the steps including generating an input AC signal which is nonsymmetrical about its zero axis and has a waveform amplitude providing an average DC current level of zero to produce constriction voltage components in an nonlinear resistance network, applying said signal in series to the members joined which form the contact resistance being measured, and then measuring the voltage of a constriction voltage component developed across said members to determine the constriction resistance of the interface between each member as a measure of contact resistance.

2. The method of claim 1 wherein said AC input signal is comprised of cycles of square wave pulses each including a first pulse of one polarity of a given amplitude and duration and a second pulse of an opposite polarity, of twice the given amplitude and half the given duration of the one pulse.

3. The method of claim 1 wherein the AC input signal waveform is of a configuration producing a third harmonic component and the step of measuring includes a measurement only of the third harmonic voltage component.

4. The method of claim 1 wherein said AC input signal is comprised of first and second signals with the first signal being twice the frequency of the second signal and with the ampere-seconds of a given cycle of the signal being approximately zero.

5. The method of claim 1 wherein said input signal is comprised of cycles of square wave pulses each including a first pulse of one polarity of a given amplitude and duration and a second pulse of an opposite polarity of an amplitude and duration different from that from the said given amplitude of the one pulse.

6. The method of claim 1 wherein said input signal waveform is a single frequency pure sine wave, such as to produce a third harmonic component in the nonlinear constriction resistance, and the step of measuring includes a measurement only of the third harmonic component.

7. In a method of measuring electrical contact resistance the steps including generating a current which is nonsymmetrical about a zero current level axis and has an average DC current level equal to zero, causing said current to flow through a sample contact defined by conductive metal members having a constriction resistance $R_o$ wherein a voltage drop V across said sample is caused by the instantaneous current amplitude $i$ flowing in series therethrough, and measuring said voltage V and current $i$ and then solving for $R_o$ from the relationship:

$$V = R_o i + 38.6 R_o^3 i^3$$

8. In a method of measuring electrical contact resistance the steps including generating an AC current which is nonsymmetrical about a zero current level axis and has an average DC level of zero, causing said current to flow through two members joined together to define a constriction resistance $R_o$ to be measured and then measuring the DC voltage $V_{DC}$ across said members and solving for $R_o$ from the relationship:

$$V_{DC} = K R_o^3 I_o^3$$

where K is an empirically determined constant and $I_o$ is the peak value of the applied current.

9. In a method of measuring electrical contact resistance the steps including generating an AC voltage of frequency $w$ and peak value $I_o$, applying said voltage across two members joined together to define the constriction resistance $R_o$ to be measured to cause a current $I_o$ to flow therethrough and then measuring the third harmonic voltage $V_3$ across said members to establish the parameter $R_o$ as related to the measured parameters:

$$V_3 = 10 R_o^3 I_o^3 \cos 3wt$$

10. In a method of measuring electrical contact resistance the steps including generating a signal comprised of sine waves of frequencies $f$ and $2f$ and of equal relative amplitudes to produce an average DC level of zero, shifting one wave such that the phase angle therebetween yields $\cos \phi = 1$, causing said signal to flow through a set of contact members having a constriction resistance $R_o$, and measuring the resulting DC voltage $V_{DC}$ across the set of contacts and then solving for $R_o$ in accordance with the relationship:

$$V_{DC} = 30 R_o^3 I_o^3$$

where $I_o$ is the peak amplitude of either of the sine wave currents.

11. In a method of measuring electrical contact resistance the steps including generating a signal comprised of a sine wave of a single frequency $wt$, developing an input signal including every negative-going half cycle of said sine wave and every other positive-going half cycle with the positive-going half cycle being twice the amplitude of the negative-going half cycle, causing said input signal to flow through to a set of contact members having a constriction resistance $R_o$ and measuring the resulting voltage $V_{DC}$ across the set of contacts and then solving for $R_o$ in accordance with the relationship:

$$V_{DC} \cong 25 R_o^3 I_o^3$$

where $I_o$ is the peak amplitude of the positive-going half cycle of applied current.

12. In a circuit for measuring the contact resistance of a set of contact members the combination including a signal generator for producing a waveform which has a level nonsymmetrical about a zero level axis with an average DC level of zero, means applying said waveform to the set of contact members to cause said waveform to flow therethrough and means to measure the resulting voltage across the contacts and to measure the current flowing therethrough.

13. The circuit of claim 12 wherein said last named means is a DC voltmeter.

14. The circuit of claim 12 wherein said last mentioned means includes a filter selective to a harmonic of the applied current.

15. The circuit of claim 12 wherein the said last mentioned means includes a device to measure distortion of the applied waveform.

16. In a circuit for measuring the contact resistance of a set of contact members the combination including a sine wave source of current, means for gating said source to produce a waveform which includes repetitive cycles each comprised of two negative-going half waves of said source current spaced apart in time by a positive half wave of said current approximately twice the amplitude of said negative-going half waves and a half wave of zero current, means coupling said cycles of said waveform to the set of contacts to cause said waveform to flow therethrough and means for filtering the voltage across said set of contacts to extract a DC component of said waveform as a measure of contact resistance.

References Cited

UNITED STATES PATENTS

| 2,371,636 | 3/1945 | McConnell | 324—64 |
| 2,896,159 | 7/1959 | Webster | 324—64 |
| 3,192,474 | 6/1965 | Cherry | 324—64 |
| 3,374,429 | 3/1968 | Rosenthal | 324—57 |

EDWARD E. KUBASIEWICZ, Primary Examiner